Aug. 20, 1957  D. D. DONALDSON  2,803,179
CAMERA
Filed July 2, 1953
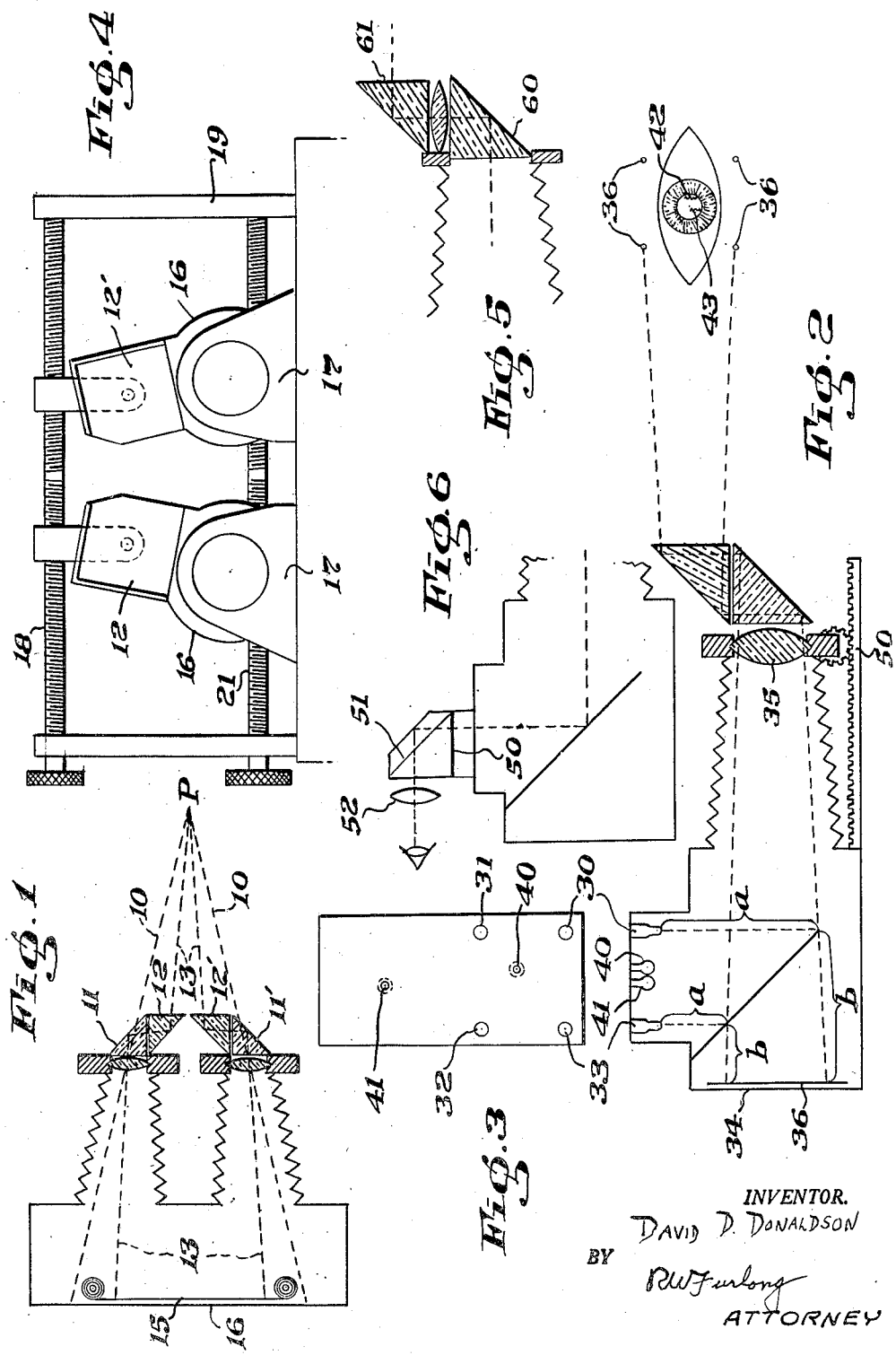
INVENTOR.
DAVID D. DONALDSON
BY
R.W. Furlong
ATTORNEY

United States Patent Office 2,803,179
Patented Aug. 20, 1957

2,803,179

CAMERA

David D. Donaldson, Belmont, Mass.

Application July 2, 1953, Serial No. 365,600

9 Claims. (Cl. 95—18)

This invention relates to a camera and pertains more specifically to a camera for taking close-up photographs, and particularly stereoscopic photographs.

One object is to provide a camera for taking close-up photographs having a view-finder operating by projection of light outwardly through the optical train of the camera itself onto the field to be photographed, to define the area of the field which will appear on the film to be exposed.

Another object is to provide a camera for taking close-up photographs with focus indicating means including a sharply defined light source in fixed relation to the film holder and arranged to be projected outwardly through the lens of the camera onto the field to be photographed to provide a sharply focused image of the light source on the field to be photographed.

Another object is to provide a stereoscopic camera for taking close-up photographs with focus indicating means including a pair of sharply defined light sources, each mounted in fixed relation to the film in each film holder and arranged to be projected outwardly through each lens of the camera onto the field to be photographed to provide images of the light sources in predetermined alignment on the field to be photographed resulting in automatic parallax correction.

Another object is to provide a stereoscopic camera having means for adjusting the spacing between lenses (the inter-lens distance), and for making a correction for parallax independently of each other.

Another object is to provide a stereoscopic camera with a periscope mounted in front of each lens, having its base centered over the lens, the periscope being rotatable about the axis of the lens to vary the effective inter-lens distance independently of the actual inter-lens distance.

Still a further object is to provide a stereoscopic camera in which the spacing between lenses may be adjusted to a value less than the diameter of the lens with its mounting.

Still a further object is to provide a stereoscopic camera adapted to take magnified photographs of subjects, particularly biological and medical subjects in vivo.

Other and further objects will be apparent from the drawings and from the description which follows:

In the drawings:

Fig. 1 is a schematic plan view of one embodiment of the invention;

Fig. 2 is a schematic longitudinal section;

Fig. 3 is a schematic plan view showing the location of the focusing and view-finding lights;

Fig. 4 is a front elevation showing the mounting of the periscopes and the means for adjusting the effective inter-lens distance, and for making parallax correction;

Fig. 5 is a schematic view showing another embodiment of the invention; and

Fig. 6 is a schematic view showing still another embodiment of the invention.

In a conventional stereoscopic camera having a pair of spaced lenses, the field to be photographed must generally be located at some distance from the lens of the camera, so that the light beams from any given point in the field will form only a small angle with each other as they pass through the spaced lenses. When the object to be photographed, P, is located close to the camera lenses as shown in Fig. 1, the divergence of the light beams 10, 10 from it to the lenses is so great that the images do not fall on the film. Even if this difficulty were corrected by extending the width of the film, the images produced would not be suitable for stereoscopic viewing, because it would be unlikely that the eyes could superimpose images taken at such divergent angles. Furthermore, even if it were possible for the eyes to superimpose the images, an entirely unrealistic effect would be obtained. Inasmuch as the eyes normally are separated by about 2½" the light beams normally striking the eyes from an object which is being viewed form a larger or smaller angle, depending upon the distance of the object from the eyes. Part of the normal function of the eyes in bringing an object at a certain distance into focus is to adjust the angle of viewing or focal angle so that the separate images normally seen by each eye are superimposed. This function is most easily performed by the normal unaided eye when the objects are at a distance ranging upwardly of three feet from the eyes.

The camera of the present invention provides a solution to these problems and makes it possible to take stereoscopic photographs even at magnifications of two times actual size or even more without "keystoning" or wedge distortion, which requires the field being photographed to be placed only a few inches from the lenses.

Accordingly, it is important, if satisfactory close-up stereoscopic photographs are to be made, that the angle of viewing be approximately the same as it is for an object disposed three to four feet away from the eyes. When the focal angle of a pair of stereoscopic photographs is too great, an unnaturally exaggerated three dimensional effect is produced. When the angle is too small, there is an unnatural lessening of the three-dimensional effect. By means of the two reflecting prisms 11, 11', 12 and 12', mounted in front of each lens of the stereoscopic camera in fixed relation to each other as shown in Fig. 1, I provide a periscopic arrangement which results in the effective inter-lens distance being reduced to the spacing between prisms 12 and 12'. The periscopes are shown as lying in a horizontal plane in Fig. 1 solely for the purpose of clarity of illustration. The periscopes normally have a position more like that shown in Fig. 4. The prisms may conveniently be right-angle prisms, with their respective reflecting surfaces in spaced parallel relation. The reflecting surfaces will, of course, form an angle of 45° with relation to the plane of the film-holder. Since prisms ordinarily do not require a bulky surrounding housing, as do lenses, the prisms need only be as large as the actual lens itself, not including its mount. Thus, inter-lens distances (actually inter-prismatic distances) can be obtained down in the range of ⅝" when employing a lens which, together with its mount, may be 1¼" in diameter or more.

The advantages of being able to attain very small inter-lens distances is of vital importance when taking photographs in actual magnification. Without this feature it is possible only to take photographs in minification.

As may be seen in Fig. 1, when the reflecting prisms arranged as periscopes in front of the lenses are employed, the light beams from the object P, as shown by the dotted lines 13—13, diverge at only a slight angle as they enter the prisms 12, 12', and the images are properly disposed on the film 15, which is mounted on film holder 16.

The present invention further makes it possible to adjust the camera for parallax correction independently of the spacing of prisms 12, 12' (which is the effective inter-lens spacing). This adjustment is made by varying the actual spacing between the lenses (which is the same as the actual spacing between prisms 11, 11' in the bases of the periscopes). As may be seen in Fig. 4, the periscopes are mounted in housings 16 which are provided with trunnion bearings 17, 17, so that each periscope as a unit may be rotated about its bearing. The bearing is so arranged that the axis of rotation coincides with the axis of the lens, the reflecting prisms 11 and 11' which form the bases of their respective periscopes being centered on the lens, as shown in Fig. 1.

In order to provide equal and opposite movement of the two reflecting prisms 12, 12' so as to vary the effective inter-lens spacing, a right- and left-hand threaded screw member 18 is provided which is rotatably mounted in standards 19, 19. Rotation of threaded screw member 18 urges prisms 12, 12' toward and away from each other, while the lower prisms 11, 11' remain in laterally fixed position, the periscopes rotating on the trunnion bearings. Since prisms 11, 11' are in permanently fixed position relative to prisms 12, 12' respectively, incident light beams entering the front of prisms 12, 12' are always reflected through prisms 11, 11' and their respective lenses.

In order to provide for parallax correction independently of the lens spacing, a second double-threaded screw member 21 is provided, mounted on standards 19, 19, to which the trunnion bearings 17, 17 are secured by means of a threaded sleeve, so that rotation of screw 21 causes movement of bearings 17, 17 together with prisms 11, 11' and their respective lenses toward and away from each other, the movement of the respective bearings being equal and opposite. The movement of the bases of the periscopes toward and away from each other is independent of the lateral position of the prisms 12, 12' at the outer end of the periscopes, the periscopes rotating about trunnion bearings 17, 17. Accordingly, it is possible, by means of this adjustment, to correct for parallax by shifting the images as they appear on the film, so as to obtain duplicating images in the proper locations on the film in the film holder.

Since this camera is of particular value for making magnified photographs of the anterior segment of the eye, it is undesirable, and in many cases impossible, to employ a bright light for focusing and view-finding purposes. Accordingly, I have provided, as shown in Figs. 2 and 3, a view-finder or means for determining the field of view which employs the optical train of the camera itself, and which avoids the necessity for brilliant lighting of the field to be photographed until the actual exposure of the film occurs. The view-finding means includes a plurality of small low power light sources 30, 31, 32, 33, arranged within the camera so as to be projected through the lens of the camera onto the field to be photographed, such as an eye, as shown in the drawing, to define, as by outlining, the area of the field which will appear on the film as it is exposed. While the lights 30—33 may be disposed in the position to be occupied by the film in the film holder, and then removed or covered when the film is inserted, it is preferable to employ a reflex camera having a mirror M pivotally mounted between the film holder 34 and the lens 35 of the camera. The light sources 30—33 may then be disposed in fixed position laterally of the normal light path from the lens to the film 36 in its film holder, the lights being projected through the lens 35 by reflection from mirror M. With this arrangement, as for example when the distance $a$ between light 33 and the mirror is identical with the distance $b$ between the mirror and the film mounted in the film holder, and with lights 30—33 spaced from each other by distances approximately equal to the dimensions of the film, the projected images 36 of these lights will define the area of the field which will appear on the film 36 when it is exposed by raising mirror M to a horizontal position and opening the shutter. When a flash is employed for illuminating the field, the mirror M itself may serve also as the shutter.

In order to provide for sharp focusing, and to determine the proper parallax correction, I provide additionally two sharply defined elongated light sources 40, 41 as for example small incandescent filament lights disposed approximately in the center of the frame of the film which is to contain each stereoscopic photograph, or in an optically equivalent position in a reflex camera in fixed relation to the position of the film as shown in Figs. 2 and 3. Light sources 40 and 41 are each displaced slightly from the center, as seen in Fig. 3, so that their corresponding images 42 and 43 will line up end-to-end and will not be exactly superimposed as they are projected through the optical train of the camera onto the field to be photographed, thus facilitating determination of proper alignment of the images in end-to-end relationship. Other predetermined relationships of images 42 and 43 may be used. Since both frames of the film are of the same size, it is apparent that duplicate images on the film frames are obtained when images 42, 43 are aligned in end-to-end relation. Furthermore, since the distance traveled by the light from sources 40, 41 to the lenses is identical with the length of the normal light path from the lenses to the film in the film holder, the images appearing on the film will be in sharp focus when images 42, 43 are also in sharp focus. In addition, when the camera has been properly adjusted to a predetermined inter-lens spacing, magnification, and parallax adjustment, the images appearing on the film will be in sharp focus when the images 42, 43 are properly lined up on the field. Accordingly, in operation of the camera the step of lining up sharply focused images 42, 43 on the field to be photographed automatically results in complete correction for parallax.

If desired, light sources 30—33 and 40—41 may be removed and replaced by a conventional ground glass viewing screen 50 as shown in Fig. 6. By mounting conventional roof prisms 51 above each image on the ground glass, together with conventional viewing lenses 52, the images will be reversed, so that the photographer will see with his left eye the lefthand stereoscopic image and with his right eye the right-hand image, exactly as it will appear in a stereoscopic viewer. Thus the effect of various inter-lens (inter-prismatic) distances may readily be determined in advance of taking the photograph.

The usual rack and pinion arrangement 50 may be provided for adjusting the spacing between the respective lenses and the film holder in order to provide for magnification of or minification of the photographic image or for focusing on a field at a given distance from the lens. The bellows are of a type which may be distorted to permit the lenses to be moved laterally with respect to the film.

In employing the camera of the present invention, it is usually preferable to adjust the inter-lens spacing by moving prisms 12, 12' toward or away from each other, and to set the spacing of the lenses from the film holders to provide for a photograph of predetermined magnification or minification. This may be accomplished with the aid of suitable calibrated scales fixed to the camera mounting on which proper settings for any given magnification are indicated. The parallax correction made by adjusting the spacing between reflecting prisms 11, 11', which form the bases of the periscopes, may likewise be made in accordance with calibrated scale settings. The required distance from the camera to the object is determined by these settings, and it is necessary only to adjust that spacing to the proper value in order to obtain sharply focused stereoscopic images with the proper parallax correction. The actual focusing may be done by lowering mirror M to the reflecting position shown in Fig. 2 and moving the camera as a whole toward or away from the field to be photographed until the images 42, 43 of the light sources 40, 41 are in sharp focus and are aligned with each other in any predetermined relation. In practice, it has been found that the necessary settings may be made, by means of calibrated scales, to set the camera for a desired magnification and inter-lens distance. These settings in turn determine the necessary parallax adjustment, the setting for which may also be made by means of a calibrated scale. The only adjustment remaining is the distance between the camera and the field to be photographed. This adjustment is conveniently made by manually moving the camera as a whole toward and away from the field until the images 42 and 43 are in the predetermined alignment (preferably end-to-end), whereupon the camera is sharply focussed upon the field. Under these circumstances it is not necessary to examine images 42 and 43 closely to determine whether they are in sharp focus, since their alignment on the field ensures sharp focus. Moreover, this procedure of focusing is even more accurate when the lenses are stopped down. The total field of view is defined by the images 36, 36 of the remaining light sources.

This camera is of particular value in photographing moving objects such as human eyes, and especially children's eyes, or of surgical operations. In making such a photograph at any desired magnification, it is necessary only to make the various settings as described above, place the camera in approximately correct position, and wait until the images 42, 43 come into correct alignment on the moving field, whereupon a cable release may be actuated which will automatically raise mirror M and operate the shutter together with a suitable flash bulb (not shown).

It is frequently desirable, when making stereoscopic photographs of surfaces which are unusually smooth or unusually rough, to vary the inter-lens spacing from the standard adjustment to produce a natural and realistic effect. In addition it occasionally is desirable to vary the inter-lens distance so as to produce a hyperstereoscopic or hypostereoscopic effect. These unusual special effects may conveniently be obtained with the camera of the present invention after a little experience by varying the spacing between prisms 12, 12' from that normally employed for a given magnification as indicated on the calibrated scale, or the effects may be conveniently determined by viewing the actual stereoscopic image by means of a viewer such as shown in Fig. 6 and described above.

Moreover, the present invention makes it possible to increase the inter-lens distance to a value greater than the distance between the respective images on the film, so as to provide natural and realistic effects in photographing distant objects. This can be accomplished simply by rotating the periscopes outwardly.

In another embodiment of the present invention, as shown in Fig. 5, the lens of the camera may be disposed between reflecting prisms 60, 61 rather than behind them. In this case the distance between the two upper prisms 61 determines the effective inter-lens distance, but the parallax adjustment is determined by the distance between the two lower prisms rather than by the spacing between the lenses themselves. This alternative construction allows even greater decrease in effective inter-lens distance, particularly where large diameter lenses must be used. However, the range of parallax adjustment is somewhat decreased in this arrangement.

It should be noted that the present invention is not limited to "still" cameras but is also adapted for use with motion picture cameras. Furthermore, the view-finder and focusing indicator are not limited to use with a stereoscopic camera, but may be employed with conventional single lens cameras used for taking "close-ups."

Although I have herein described specific embodiments of my invention, I do not intend to limit myself thereto, but to include all of the obvious variations and modifications within the spirit and scope of the appended claims.

I claim:

1. In a stereoscopic camera having a pair of spaced lenses for taking close-up photographs, focus indicating and parallax correcting means including a pair of sharply defined light sources, each light source being mounted for projection of its image outwardly through one said lens onto the field to be photographed and arranged in a position fixed with respect to the film-holder for its respective lens so that the distance traveled by the light from each light source to its corresponding lens is equal to the length of the light path from said lens to a film mounted in its respective filmholder, and means for adjusting the distance between each said lens and its respective film holder and for adjusting the spacing between said lenses so as to obtain images of said light sources upon said field in predetermined alignment with each other, whereby parallax is automatically corrected when said images are in alignment.

2. In a reflex stereoscopic camera having a pair of spaced-apart lenses for taking close-up stereoscopic photographs and having a reflecting surface pivotally mounted between each lens and its respective film-holder swingable into and out of a position to intercept the light-path between said lens and said film-holder, a view-finder, focus and parallax correction indicating means comprising a separate sharply defined light source arranged in fixed position with relation to each said film-holder, a plurality of supplemental light sources in combination with at least one of the first said light sources arranged to outline a plane area approximately the size of one of the films to be exposed and arranged in fixed position with relation to the respective film-holder, said light sources all being disposed laterally of the normal light path from the lenses to their respective film-holders, in a position to be reflected into their respective lenses when the reflecting surface is swung into said light path, the distance traveled by the light from the light sources to their respective lenses being equal to the length of said light path, means for adjusting the distance between each lens and its respective film-holder and for adjusting the spacing between lenses to project upon the field to be photographed images of the light sources outlining the area which will appear upon the film to be exposed and to obtain sharply focused images of said sharply defined light sources upon said field in predetermined aligned relation to each other, resulting in automatic parallax correction.

3. In a stereoscopic camera having a pair of spaced lenses for taking stereoscopic photographs, an assembly including a pair of reflecting surfaces for each said lens, the first said reflecting surface of each assembly being arranged to reflect light from the second reflecting surface to said film holder, the second said reflecting surface being disposed parallel to and spaced from the first in fixed relation thereto to reflect incident light into the first said reflecting surface, each said assembly being mounted for rotation about an axis passing through the center of the first said reflecting surface perpendicular to its respective film holder, means for adjusting the spacing between the first said reflecting surfaces and the spacing between the second said reflecting surfaces independently of each other, whereby the effective inter-lens spacing and the parallax correction may be adjusted independently of each other.

4. A stereoscopic camera as defined in claim 3 wherein each lens is disposed between the reflecting surfaces of each said assembly in fixed relation thereto.

5. A stereoscopic camera as defined in claim 3 wherein both reflecting surfaces of each assembly are mounted adjacent the face of the lens remote from the film holder, the axis of rotation of each assembly coinciding with the axis of its respective lens, the lenses being adjustable toward and away from each other along with the first reflecting surfaces.

6. A stereoscopic camera having a pair of spaced-apart lenses for taking stereoscopic photographs, said camera comprising a periscope mounted adjacent the outer face of each lens for rotation about the axis of said lens, means for adjustably moving said lenses, together with the bases of said periscopes, toward and away from each other independently of the spacing of the outer ends of said periscopes, and means for adjustably moving the outer ends of said periscopes toward and away from each other independently of their bases, whereby the effective inter-lens spacing and the parallax correction may be adjusted independently of each other.

7. A reflex stereoscopic camera having a pair of spaced-apart lenses for taking close-up stereoscopic photographs and having a reflecting surface pivotally mounted between each lens and its respective film-holder swingable to and from a position to intercept the light path between said lens and said film-holder, said camera comprising, in combination, a periscope mounted adjacent the outer face of each lens for rotation about the axis of said lens, means for adjustably moving said lenses together with the bases of said periscopes toward and away from each other independently of the spacing of the outer ends of said periscopes, and means for adjustably moving the outer ends of said periscopes toward and away from each other independently of their bases, whereby the effective inter-lens spacing and the parallax correction may be adjusted independently of each other, and a view-finder, focus and parallax correction indicating means for the camera including a separate sharply defined light source arranged in fixed position with relation to each said film-holder, a plurality of supplemental light sources in combination with at least one of the first said light sources arranged to outline a plane area approximately the size of one of the films to be exposed and arranged in fixed position with relation to the respective film-holder, said light sources all being disposed laterally of the normal light path from the lenses to their respective film-holders in a position to be reflected into their respective lenses when the reflecting surface is swung into said light path, the distance traveled by the light from the light sources to their respective lenses being equal to the length of said light path, means for adjusting the distance between each lens and its respective film holder and for adjusting the spacing between lenses to project upon the field to be photographed images of the light sources outlining the area which will appear upon the film to be exposed and to obtain sharply focused images of said sharply defined light sources upon said field in predetermined aligned relation to each other resulting in automatic parallax correction.

8. A stereoscopic camera for taking photographs with variable stereoscopic effects, said camera comprising a pair of spaced-apart periscopic assemblies, each said assembly including an image-forming lens and a pair of reflecting surfaces and having an outer light-receiving end and an inner light-transmitting end, each said assembly being mounted for rotation about its inner end whereby the spacing between the outer ends of said pair of assemblies may be varied independently of the spacing between their respective inner ends, and the inner ends of said assemblies being mounted for movement toward and away from each other to provide means for parallax correction at any given spacing between said outer ends.

9. In a stereoscopic camera having a film holder and a pair of spaced-apart lenses for taking close-up stereoscopic photographs, a parallax-correction indicating means comprising a pair of separate sharply defined light sources within the camera in fixed position with respect to the picture image formed by each said lens, an image of each said light source being adapted to be projected through its respective lens onto the field to be photographed, means for projecting a plurality of view-finding light source images through at least one of said lenses in position to define, upon the field to be photographed, the area which will appear upon the film to be exposed in the film holder, said lenses being mounted for movement toward and away from the film holder and for lateral movement toward and away from each other, whereby adjustment of the positions of said lenses to obtain sharply focused images of said separate light sources in predetermined alignment with each other on the field to be photographed automatically produces parallax correction and formation of sharply focused images upon the film to be exposed.

References Cited in the file of this patent

UNITED STATES PATENTS

| | | |
|---|---|---|
| 1,687,030 | Mitchell | Oct. 9, 1928 |
| 1,813,690 | Weisker | July 7, 1931 |
| 2,095,815 | Hopkins | Oct. 12, 1937 |
| 2,305,437 | Meyers | Dec. 15, 1942 |
| 2,337,463 | Hall | Dec. 21, 1943 |
| 2,415,424 | Gaebel | Feb. 11, 1947 |
| 2,495,288 | Richards | Jan. 24, 1950 |
| 2,506,764 | Bach | May 9, 1950 |
| 2,601,086 | Bucky | June 11, 1952 |

FOREIGN PATENTS

| | | |
|---|---|---|
| 889,733 | France | Oct. 11, 1943 |
| 404,385 | Italy | Feb. 7, 1942 |
| 456,501 | Italy | Apr. 12, 1950 |